United States Patent
Danilov et al.

(10) Patent No.: US 10,594,792 B1
(45) Date of Patent: Mar. 17, 2020

(54) SCALE-OUT ERASURE CODING

(71) Applicant: EMC IP Holding Company LLC, Hopkinton, MA (US)

(72) Inventors: Mikhail Danilov, Saint Petersburg (RU); Andrey Kurilov, Saint Petersburg (RU)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 264 days.

(21) Appl. No.: 15/791,388

(22) Filed: Oct. 23, 2017

(51) Int. Cl.
*H04L 29/08* (2006.01)
*G06F 15/173* (2006.01)
*G06F 9/50* (2006.01)
*G06F 16/174* (2019.01)

(52) U.S. Cl.
CPC ........ *H04L 67/1097* (2013.01); *G06F 9/5083* (2013.01); *G06F 16/1752* (2019.01); *H04L 67/327* (2013.01)

(58) Field of Classification Search
CPC . H04L 67/1097; H04L 67/10; H04L 67/1095; H04L 67/327; H04L 2209/34; G06F 9/5083; G06F 16/1752; G06F 3/0619; G06F 11/1076; G06F 11/16
USPC ........................................................ 709/223
See application file for complete search history.

(56) References Cited

U.S. PATENT DOCUMENTS

| | | | | |
|---|---|---|---|---|
| 9,367,243 | B1* | 6/2016 | Hayes | G06F 3/0608 |
| 9,747,229 | B1* | 8/2017 | Hayes | G06F 13/28 |
| 9,910,618 | B1* | 3/2018 | Curley | G06F 11/2092 |
| 9,990,252 | B1* | 6/2018 | Morlang | G06F 11/1076 |
| 2015/0149423 | A1* | 5/2015 | Kiselev | G06F 16/21 707/694 |
| 2017/0083416 | A1* | 3/2017 | Richardson | G06F 11/1076 |
| 2018/0027681 | A1* | 1/2018 | Davis | H05K 7/1498 361/679.31 |
| 2018/0039543 | A1* | 2/2018 | Luby | G06F 3/0659 |
| 2018/0217898 | A1* | 8/2018 | Tormasov | G06Q 20/387 |
| 2019/0073265 | A1* | 3/2019 | Brennan | G06F 11/1076 |

* cited by examiner

*Primary Examiner* — Ruolei Zong
(74) *Attorney, Agent, or Firm* — Amin, Turocy & Watson, LLP

(57) ABSTRACT

Overhead associated with data re-protection during scaling out and/or scaling up of a cloud storage system can be reduced. During initial data protection (e.g., prior to a change in the cluster size), data fragments and coding fragments can be stored as a set of adjacent data sub-fragments and a set of adjacent coding sub-fragments, respectively. In response to determining that the cluster has expanded, a portion of the set of adjacent data sub-fragments can be moved to the new nodes that have been added to the cluster. Further, the set of adjacent coding sub-fragments can be combined to generate a new coding fragment that can be stored within the new cluster. Accordingly, the amount of system resources utilized during re-protection can be significantly reduced.

20 Claims, 15 Drawing Sheets

SCALE-OUT ERASURE CODING

TECHNICAL FIELD

The subject disclosure relates generally to a system and method for scale-out erasure coding.

BACKGROUND

The large increase in amount of data generated by digital systems has created a new set of challenges for data storage environments. Traditional storage area network (SAN) and/or network-attached storage (NAS) architectures have not been designed to support data storage or protection at large multi-petabyte capacity levels. Object storage technology can be utilized to meet these requirements. With object storage technology, organizations can not only keep up with rising capacity levels, but can also store these new capacity levels at a manageable cost point.

Typically, a scale-out, cluster-based, shared-nothing object storage that employs a microservices architecture pattern, for example, an Elastic Cloud Storage (ECS) can be utilized as a storage environment for a new generation of workloads. ECS is a cloud-based object storage appliance, wherein the storage control software and the physical magnetic disk media are combined as an integrated system with no access to the storage media other than through the ECS. ECS is an append-only virtual storage platform that protects content from being erased or overwritten for a specified retention period. In particular, ECS does not employ traditional data protection schemes like mirroring or parity protection. Instead, ECS utilizes erasure coding for data protection, wherein a data chunk is broken into fragments, expanded, and encoded with redundant data pieces and then stored across a set of different locations or storage media.

The above-described background relating to storage systems is merely intended to provide a contextual overview of some current issues, and is not intended to be exhaustive. Other contextual information may become further apparent upon review of the following detailed description.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Example systems and methods disclosed herein relate to scale-out erasure coding for data protection in a scale-out/scale-up cloud-based storage systems. In one example embodiment, a system is disclosed that comprises a processor and a memory that stores executable instructions that, when executed by the processor, facilitate performance of operations. Moreover, the operations comprise storing, across first nodes of an network-based storage system, data fragments associated with a chunk of data, wherein the storing comprises storing the data fragments as respective groups of adjacent data sub-fragments; and storing, within a second node of the network-based storage system, a first coding fragment associated with the data fragments, wherein the storing comprises storing the first coding fragment as a group of adjacent coding sub-fragments. Further, the operations comprise in response to determining that a set of additional nodes, of the network-based storage system other than the first nodes or the second node, have been added to the network-based storage system, moving a portion of the respective groups of adjacent data sub-fragments to the set of additional nodes, and combining the group of adjacent coding sub-fragments to generate a second coding fragment different than the first coding fragment.

Another example embodiment of the specification relates to a method that comprises based on an erasure coding scheme, determining, by a system comprising a processor, data fragments and a coding fragment associated with a chunk of data; and storing, within different nodes of an object storage system, the data fragments as respective groups of adjacent data sub-fragments and the coding fragment as a group of adjacent coding sub-fragments. According to an aspect, the method further comprises in response to determining that additional nodes have been added to the object storage system, moving a portion of the respective groups of adjacent data sub-fragments to the additional nodes, and combining the group of adjacent coding sub-fragments to generate an updated coding fragment.

Another example embodiment of the specification relates to a computer-readable storage medium comprising instructions that, in response to execution, cause a computing node device comprising a processor to perform operations, comprising based on an erasure coding, determining, data fragments and a coding fragment associated with a chunk of data; storing, within different nodes of an object storage system, the data fragments as respective groups of adjacent data sub-fragments and the coding fragment as a group of adjacent coding sub-fragments; and in response to determining that additional nodes have been added to the object storage system, facilitating a transfer of a portion of the respective groups of adjacent data sub-fragments to the additional nodes, and updating the coding fragment based on a result of combining the group of adjacent coding sub-fragments.

The following description and the drawings set forth certain illustrative aspects of the specification. These aspects are indicative a few of the various ways in which the principles of the specification may be employed. Other advantages and novel features of the specification will become apparent from the detailed description of the specification when considered in conjunction with the drawings.

DETAILED DESCRIPTION

Figure 1:
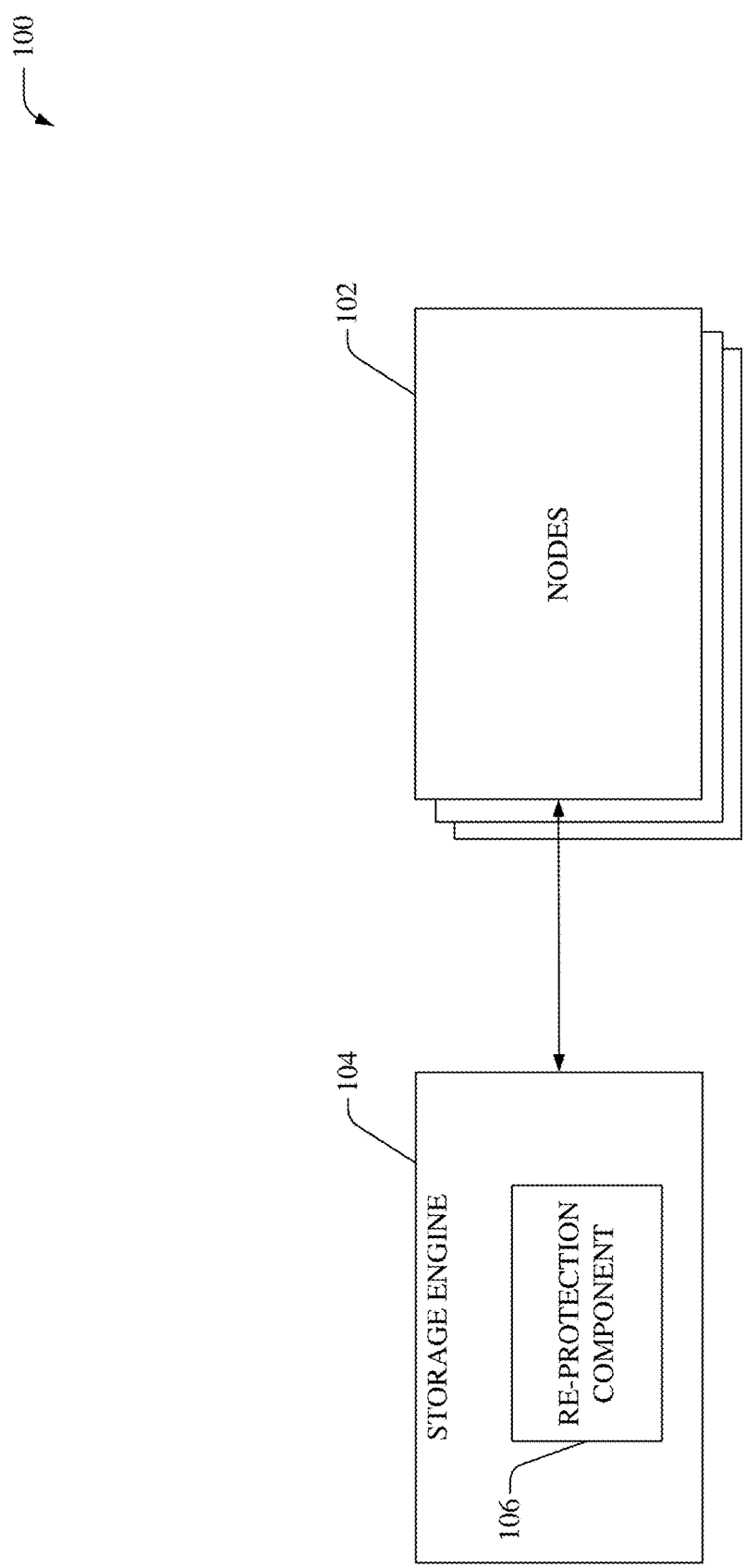
FIG. 1 illustrates an example system that facilitates data protection during expansion of a cloud storage system.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

The term "cloud" as used herein can refer to a cluster of nodes (e.g., set of network servers), for example, within a distributed storage system, that are communicatively and/or operatively coupled to each other, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with each other to provide resources for end-users.

Example systems and methods disclosed herein, in one or more embodiments, relate to a scale-out elastic cloud storage (ECS) platform that can combine the cost advantages of commodity infrastructure with the reliability, availability and serviceability of traditional arrays. In one aspect, the ECS platform can comprise a cluster of nodes (also referred to as "cluster" herein) that delivers scalable and simple public cloud services with the reliability and/or control of a private-cloud infrastructure. Moreover, the ECS platform comprises a scale-out, cluster-based, shared-nothing object storage, which employs a microservices architecture pattern. The ECS platform can support storage, manipulation, and/or analysis of unstructured data on a massive scale on commodity hardware. As an example, ECS can support mobile, cloud, big data, and/or social networking applications. ECS can be deployed as a turnkey storage appliance or as a software product that can be installed on a set of qualified commodity servers and disks. The ECS scale-out, geo-distributed architecture is a cloud platform that can provide at least the following features: (i) lower cost than public clouds; (ii) unmatched combination of storage efficiency and data access; (iii) anywhere read/write access with strong consistency that simplifies application development; (iv) no single point of failure to increase availability and performance; (v) universal accessibility that eliminates storage silos and inefficient extract, transform, load (ETL)/data movement processes; etc.

ECS does not employ traditional data protection schemes like mirroring or parity protection. Instead, ECS utilizes erasure coding for data protection. However, conventional erasure coding mechanisms do not scale and can create challenges for scale-out storage like ECS. The systems and methods disclosed herein facilitate scaling with erasure coding. Although the systems and methods disclosed herein have been described with respect to object storage systems (e.g., ECS), it is noted that the subject specification is not limited to object storage systems and can be utilized for most any scale-out and/or scale-up storage systems that utilize erasure coding (e.g., file storage systems, such as but not limited to, Dell EMC® Isilon file storage system).

Referring initially to FIG. 1, there illustrated is an example system 100 that facilitates data protection during expansion of a cloud storage system, according to one or more aspects of the disclosed subject matter. In one aspect, cloud storage system (e.g., ECS) can ensure durability, reliability, and/or availability of objects by creating and distributing multiple copies of objects and their metadata across the set of nodes 102 in the local site. After the multiple copies are successfully written, the system can erasure-code the object copies to reduce storage overhead. Typically, a storage service layer can handle data availability and protection against data corruption, hardware failures, and/or data center disasters. A storage engine 104 can be a part of the storage services layer. As an example, the storage engine 104 can be a distributed shared service that runs on each node (e.g., nodes 102), and can manage transactions and persists data to the nodes. Typically, the storage engine 104 can enable global namespace management across geographically dispersed data centers through geo-replication. According to an aspect, the storage engine 104 can write all object-related data (such as, user data, metadata, and/or object location data) to logical containers of contiguous disk space known as chunks. Chunks are open and accepting writes, or closed and not accepting writes. After chunks are closed, the storage engine 104 erasure-codes the chunks.

Erasure coding is a method of data protection in which a data is broken into fragments, expanded and encoded with redundant data pieces and stored across a set of different locations or storage media. During erasure coding, the storage engine 104 can divide a data chunk into k data fragments (wherein k can be most any integer). Further, the storage engine 104 can encode the k data fragments to generate redundant m coding fragments (wherein m can be most any integer). This protection scheme can be described as a k+m protection scheme. In an aspect, the fragments are encoded in a manner such that the system can tolerate the loss of any m fragments.

Normally, there is minimal sense in choosing such k and m, which in sum make a greater number than the number of drives in the system. Typically, k+m is less than or equal to the number of drives. In this case, m is the number of drive failures the storage system may endure without loss of user data. The greater the value for m, the higher the storage availability and durability. On the other hand, the greater the value for m, the higher the overhead on data protection. The overhead can be calculated as m/k. In order to keep the overhead reasonable, a greater m value can be compensated by greater k value. However, the greater sum k+m, the fewer the number of node failures that can be endured by the storage system. This number (n) can be calculated using the equation below.

$$n = \min\left(\left\lfloor \frac{m*N}{k+m} \right\rfloor, m\right) \quad (1)$$

Wherein N is the number of nodes in the cluster.

As an example, consider that a 10+2 (k+m) protection scheme is utilized for a cluster of six nodes (N). In this example scenario, the storage system can endure loss of any two drives or only one node. However, it is not possible to reduce capacity overheads on data protection via increasing k because this would make the system unable to endure even a single node failure. At least one node can store three or more data/coding fragments, while data recovery is not possible after more than two (m) fragments are lost. Thus, a protection scheme can be customized for a given storage system, which is described with the number or disks/nodes and/or their failure probabilities. Conventionally, storage systems can scale-out while a protection scheme once chosen remains the same. For example, in an ECS, the number of nodes may change from four to hundreds. If a specific protection scheme is chosen for an initial/small cluster configuration, oftentimes the scheme does not meet the requirements for a final/large cluster configuration (and vice versa). Specifically, larger clusters allow higher capacity use efficiency since they allow greater k values. When a smaller value of k is chosen for a small cluster, the capacity use efficiency can be below the mark after the cluster grows large. Alternatively, when a larger value of k is chosen for a large cluster, the protection scheme does not meet requirements for the number of node failures the storage system can endure when the cluster is reduced.

Referring back to FIG. 1, a re-protection component 106 is utilized to scale the erasure coding protection scheme as storage scales. Moreover, the re-protection component 106 can determine when nodes are added to (and/or removed from) a cluster and can adjust the protection scheme (e.g., modify k and/or m values) to better suit (e.g., provide a higher capacity use efficiency, reduce capacity overhead, meet requirements for the minimum number of node failures that can be endured, etc.) the new cluster size. According to an aspect, the re-protection component 106 can read the data fragments, divide the data fragments into a group of new data fragments, and store the new data fragments to the different nodes within the new cluster. Further, the re-protection component 106 can encode the new data fragments, for example, using the adjusted protection scheme, to generate one or more coding fragments that can also be stored within the cluster. Furthermore, the re-protection component 106 can delete the old data and coding fragments.

Alternatively, the re-protection component 106 can employ an optimized data re-protection technique, wherein during initial protection (e.g., prior to a change in the cluster size), each data fragment can be stored as a set of adjacent data sub-fragments. In response to determining that the cluster size has changed, the re-protection component 106 can move a subset of the set of adjacent data sub-fragments to the new cluster. The resulting layout of data fragments can be determined based on the adjusted protection scheme. Further, during initial protection (e.g., prior to a change in the cluster size), each coding fragment can be stored as a set of adjacent coding sub-fragments. In response to determining that the cluster size has changed, the re-protection component 106 can combine (add and/or perform a logical operation) the adjacent coding sub-fragments and generate a new coding fragment that can be stored within the new cluster. Accordingly, the amount of system resources (network/drive traffic, memory, and CPU) utilized during re-protection can be significantly reduced.

In one example, system 100 can be part of most any object storage system such as, but not limited to, a Dell EMC® Elastic Cloud Storage (ECS™). It is noted that the nodes 102 can comprise volatile memory(s) or nonvolatile memory(s), or can comprise both volatile and nonvolatile memory(s). Examples of suitable types of volatile and non-volatile memory are described below with reference to FIG. 10. The memory (e.g., data stores, databases) of the subject systems and methods is intended to comprise, without being limited to, these and any other suitable types of memory. Although systems and methods disclosed describe a scale-out architecture, it is noted that the subject specification is not limited to scale-out architectures and can be applied to scale-up architecture as well.

Figure 2A:
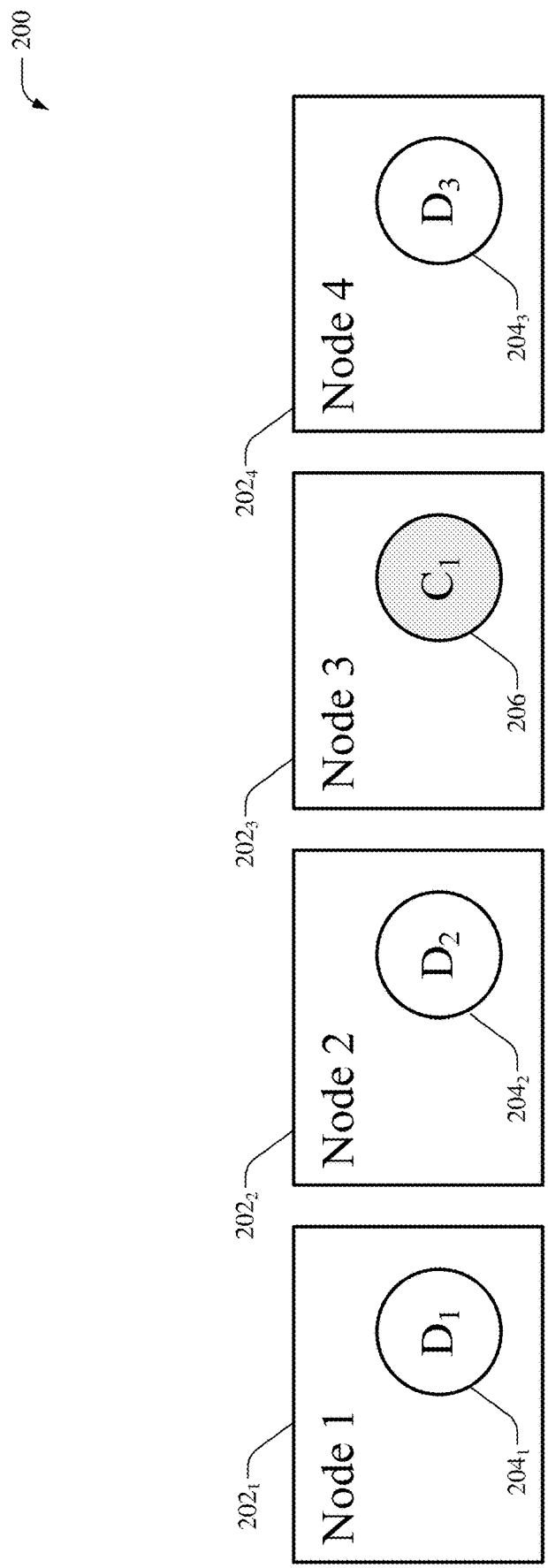
FIGS. 2A-2B illustrate example systems 200-250 that facilitate data re-protection when a cluster is scaled out.
Figure 2B:
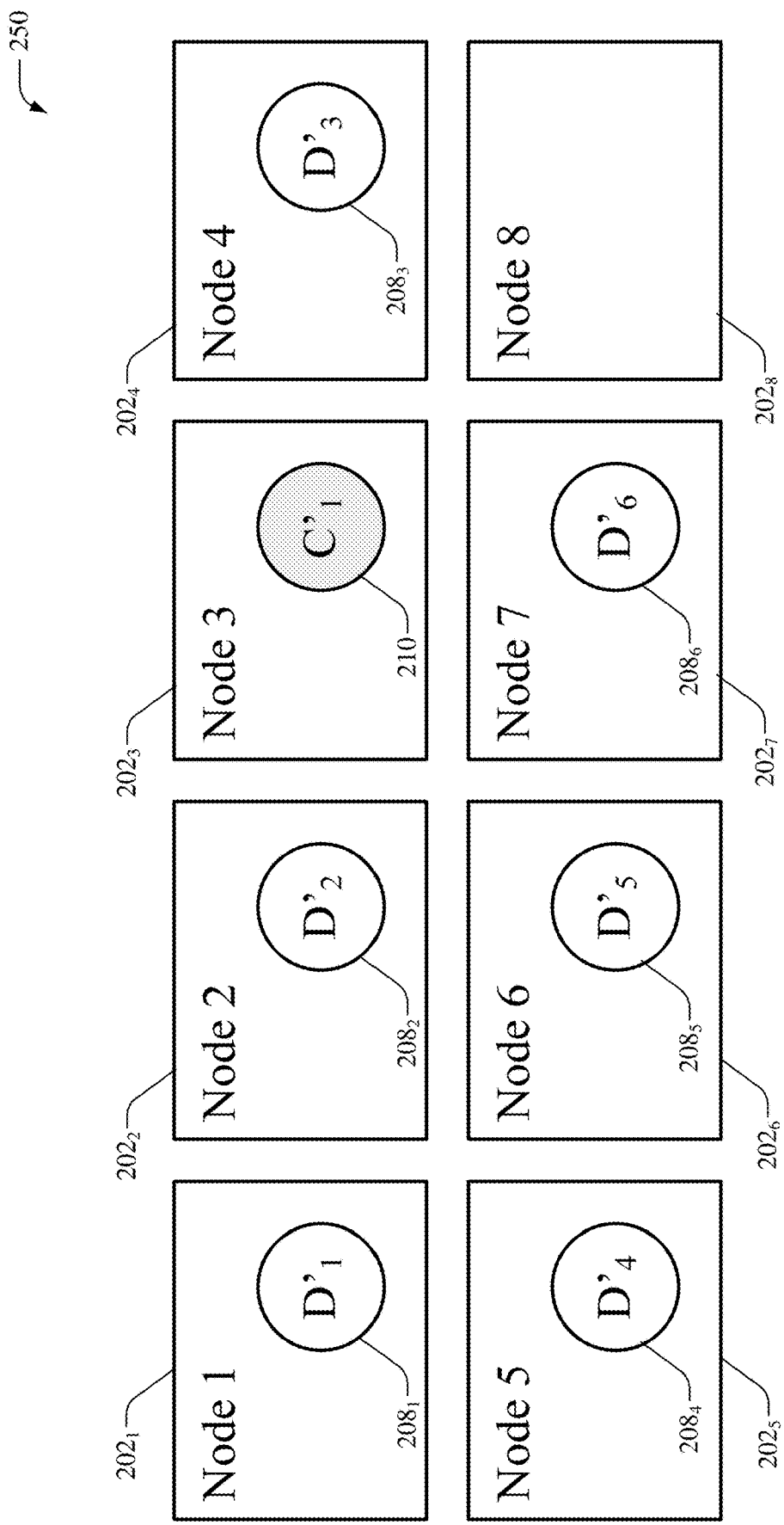

Referring now to FIGS. 2A-2B, there is illustrated are example systems 200-250 that facilitate data re-protection when a cluster is scaled out, according to an aspect of the specification. Systems 200 and 250 depict an example scenario wherein an erasure coding protection scheme is changed when the size of a storage cluster increases. However, it is noted that the subject specification is not limited to changing erasure coding protection scheme when size of the storage cluster is increased and that the erasure coding protection scheme can be changed, based on the embodiments described herein, when the size of the storage cluster is decreased. System 200 depicts a cluster having an initial configuration of four nodes—Node 1-Node 4 ($202_1$-$202_4$) and system 250 depicts a scaled version of the original cluster wherein four additional nodes, Node 5-Node 8 ($202_5$-$202_8$), have been added to the cluster.

Referring to FIG. 2A, a 3+1 (k+m) data protection has been chosen for the cluster. As an example, a parity protection scheme can be utilized; however, it is noted that the subject specification is not limited to utilizing a parity protection scheme and most any erasure coding scheme can be utilized. A chunk of data can be split into three data fragments, D1-D3 ($204_1$-$204_3$), that can be stored (e.g., by the storage engine 104) on different nodes (Node 1, Node 2, and Node 4 respectively) of the cluster. According to an aspect, a parity/coding fragment C1 (206) can be generated (e.g., by the storage engine 104), for example, based on applying an XOR operation on the data fragments, D1-D3 ($204_1$-$204_3$), and can be stored (e.g., by the storage engine 104) on Node 3. In this example scenario, the overhead on data protection can be ⅓. Although a cluster with four nodes has been depicted, it is noted that the cluster can initially comprise a greater or fewer number of nodes.

Referring now to FIG. 2B, wherein the cluster is expanded and four additional nodes, Node 5-Node 8 ($202_5$-$202_8$), have been added to the cluster; the protection scheme can be modified to a 6+1 scheme (e.g., by the re-protection component 106) to reduce capacity overhead on data protection. The overhead on data protection with the new 6+1 scheme can be ⅙. It is noted that the 6+1 scheme cannot be utilized for the initial cluster configuration (of system 200) because the cluster would not tolerate a node failure. In one aspect, the data portion is re-protected (e.g., by the re-protection component 106) as follows: the three data fragments D1-D3 ($204_1$-$204_3$) are read, split into six new data fragments, D'1-D'6 ($208_1$-$208_6$), and then stored on different cluster nodes. Further, the new data fragments are encoded to generate a new coding fragment C'1 (210), which is also stored to a cluster node (e.g., Node 3). The old data and coding fragments, D1-D3 ($204_1$-$204_3$) and C1 (206), are then deleted. Moreover, FIG. 2B illustrates an example layout of data and coding fragments within the expanded cluster after re-protection has been completed. Although the expanded cluster comprises four additional nodes, it is noted that a greater or fewer number of nodes can be added (or removed) from the original cluster. Further, it is noted that the Nodes 1-8 ($202_1$-$202_8$) are substantially similar to the nodes 102 described with respect to system 100 and can include functionality as more fully described herein, for example, as described above with regard to the nodes 102.

The re-protection mechanisms described with regard to systems 100, 200, and 250 have the following challenges: (i) re-protection of all data after cluster expansion can generate severe workload; (ii) since all data is read and stored again, network and drive traffic is significantly increased; and/or (iii) since all data is re-encoded, CPU utilization within the cluster is significantly increased. With respect to the first challenge, data re-protection can be performed in the background with low intensity, to reduce the impact on overall storage system performance (given that one of the goals of data re-protection is to increase capacity use efficiency). To address the other challenges, example system 300 of FIG. 3 can be utilized.

Figure 3:
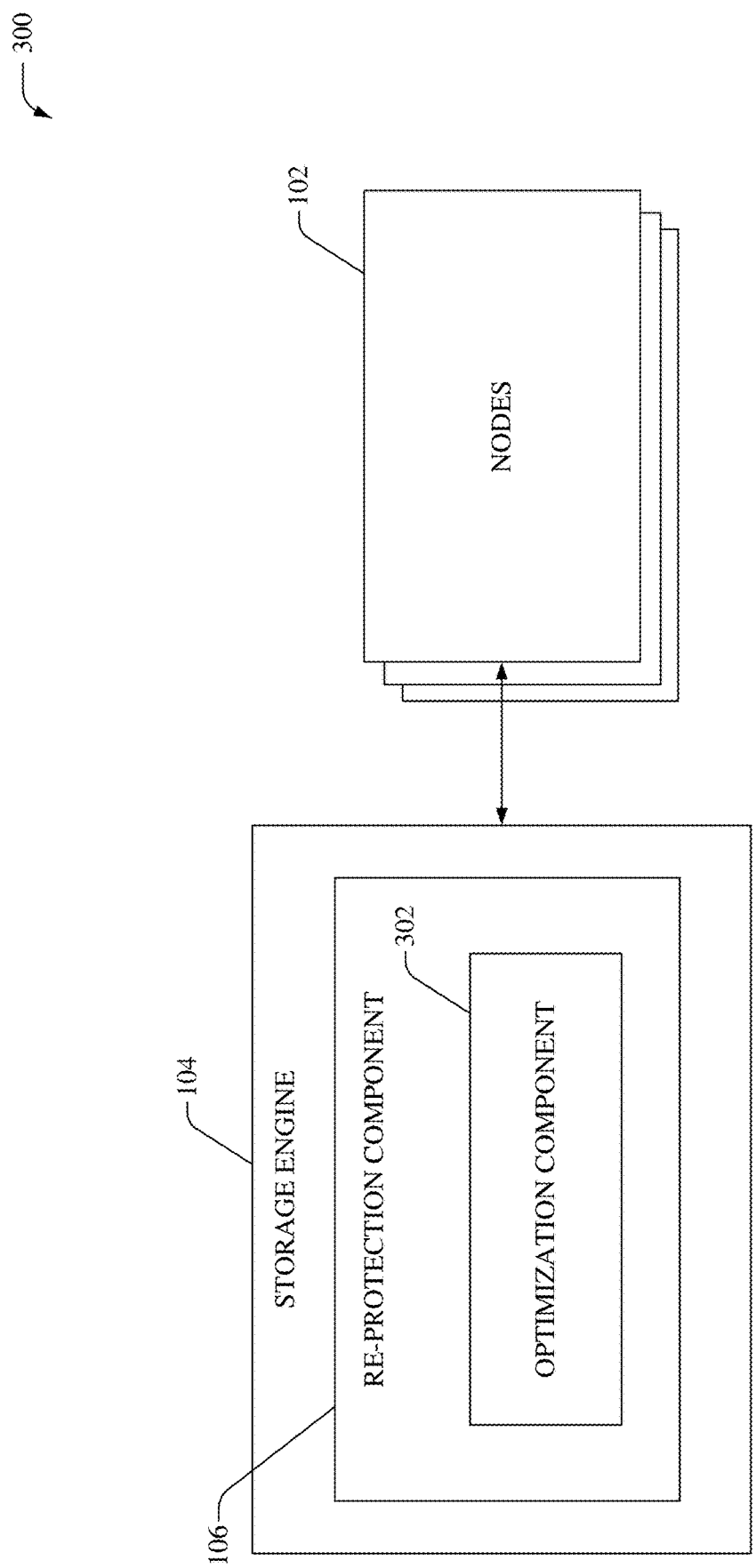
FIG. 3 illustrates an example system that optimizes data re-protection when a cluster is scaled out.

FIG. 3 illustrates an example system 300 that optimizes data re-protection when a cluster is scaled out, according to one or more aspects of the disclosed subject matter. It is noted that the nodes 102, storage engine 104, and re-protection component 106 can include functionality as more fully described herein, for example, as described above with regard to system 100. In one aspect, an optimization component 302 can be utilized to provide an efficient mechanism for re-protection of data. Typically, the optimization component 302 can be utilized based on a cost-benefit analysis, for example, when determined that switching from one protection scheme to another can result in capacity benefits that would cover the expenses associated with data re-protection. As an example, switching from a protection scheme with four data fragments to a protection scheme with five data fragments may give capacity benefits that would not cover the expenses associated with data re-protection. In another example, if the number of data fragments is doubled, tripled, etc., the optimization component 302 can be utilized to facilitate re-protection of the data.

According to an embodiment, when data is written and protected using the initial protection scheme, the data can be stored (e.g., by the storage engine 104) in a defined format that simplifies future data re-protection. In one example, a data fragment can be stored as a group of adjacent sub-fragments. In this example scenario, during re-protection, the optimization component 302 can move a portion of the group of adjacent sub-fragments to a new cluster node. Since only a portion of the original data fragments are read and moved, the network and drive traffic is reduced. The resulting layout of the data fragments is determined based on the new protection scheme applied.

According to another embodiment, coding fragments generated using the initial protection scheme can also be stored (e.g., by the storage engine 104) in the defined format that simplifies future data re-encoding. As an example, a coding fragment can be stored as a group of adjacent sub-fragments. To reduce the computational resources utilized during re-encoding of data fragments, the optimization component can combine (e.g., add or XOR) sub-fragments of each coding fragment to generate a new coding fragment. Moreover, when a protection scheme is changed to assure higher capacity use efficiency (e.g., number of coding fragments remain the same), a coding matrix that is utilized to generate coding fragments can be modified (e.g., doubled, tripled, etc.) corresponding to the change in the cluster.

Figure 4A:
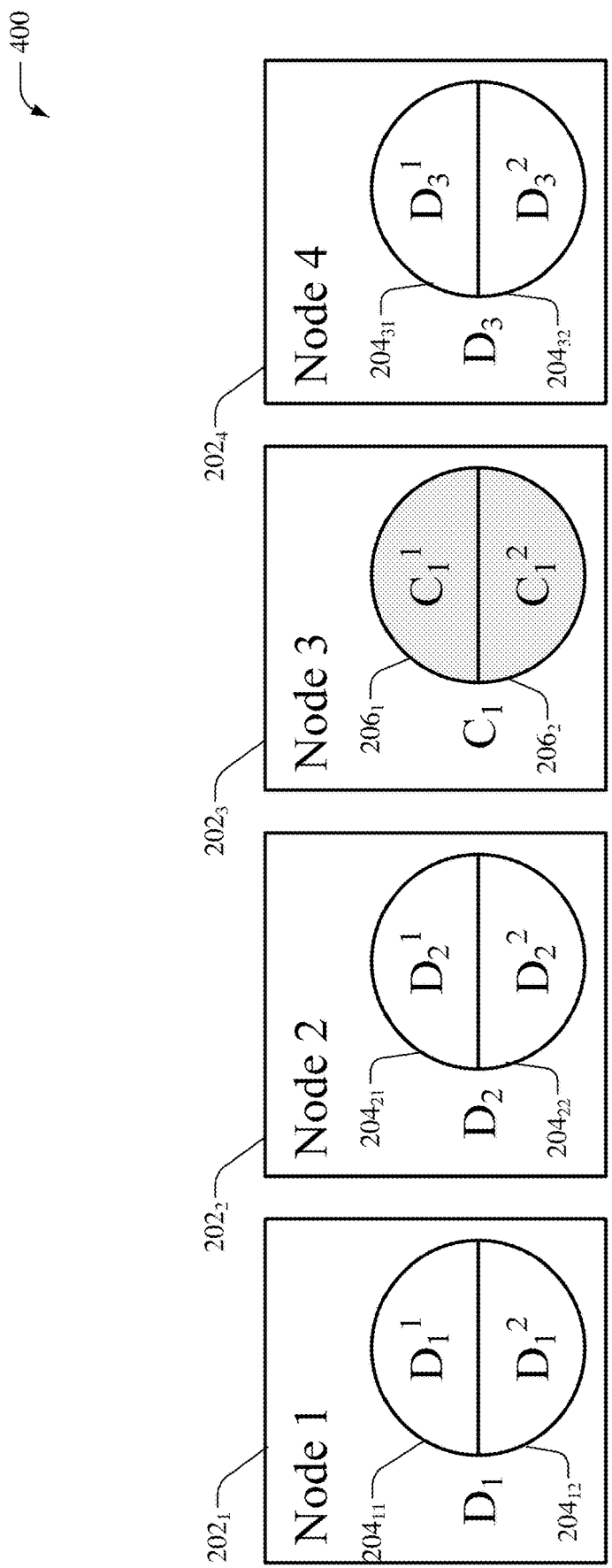
FIGS. 4A-4C illustrate an efficient implementation of data re-protection in accordance with an aspect of the specification.
Figure 4B:
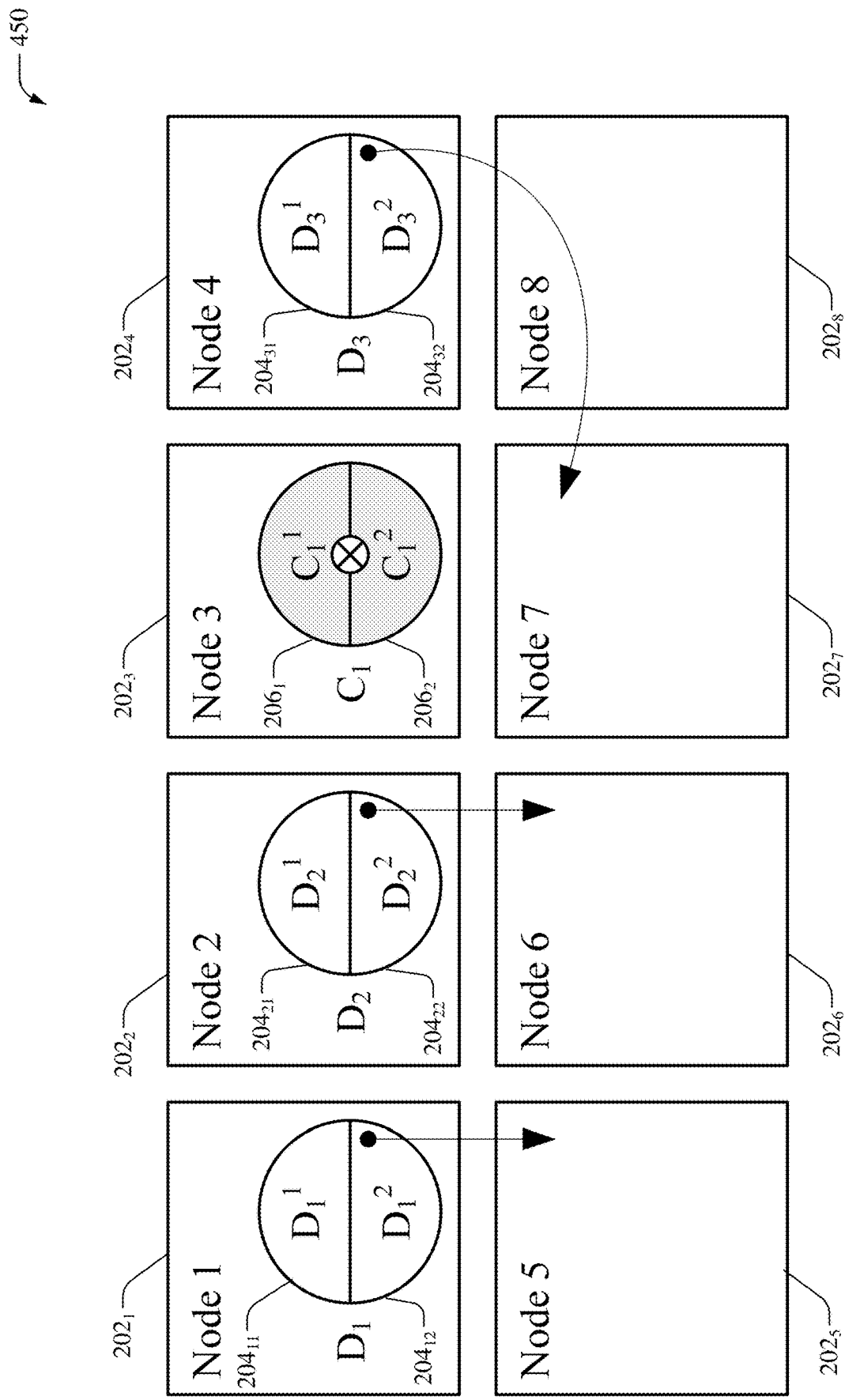
Figure 4C:
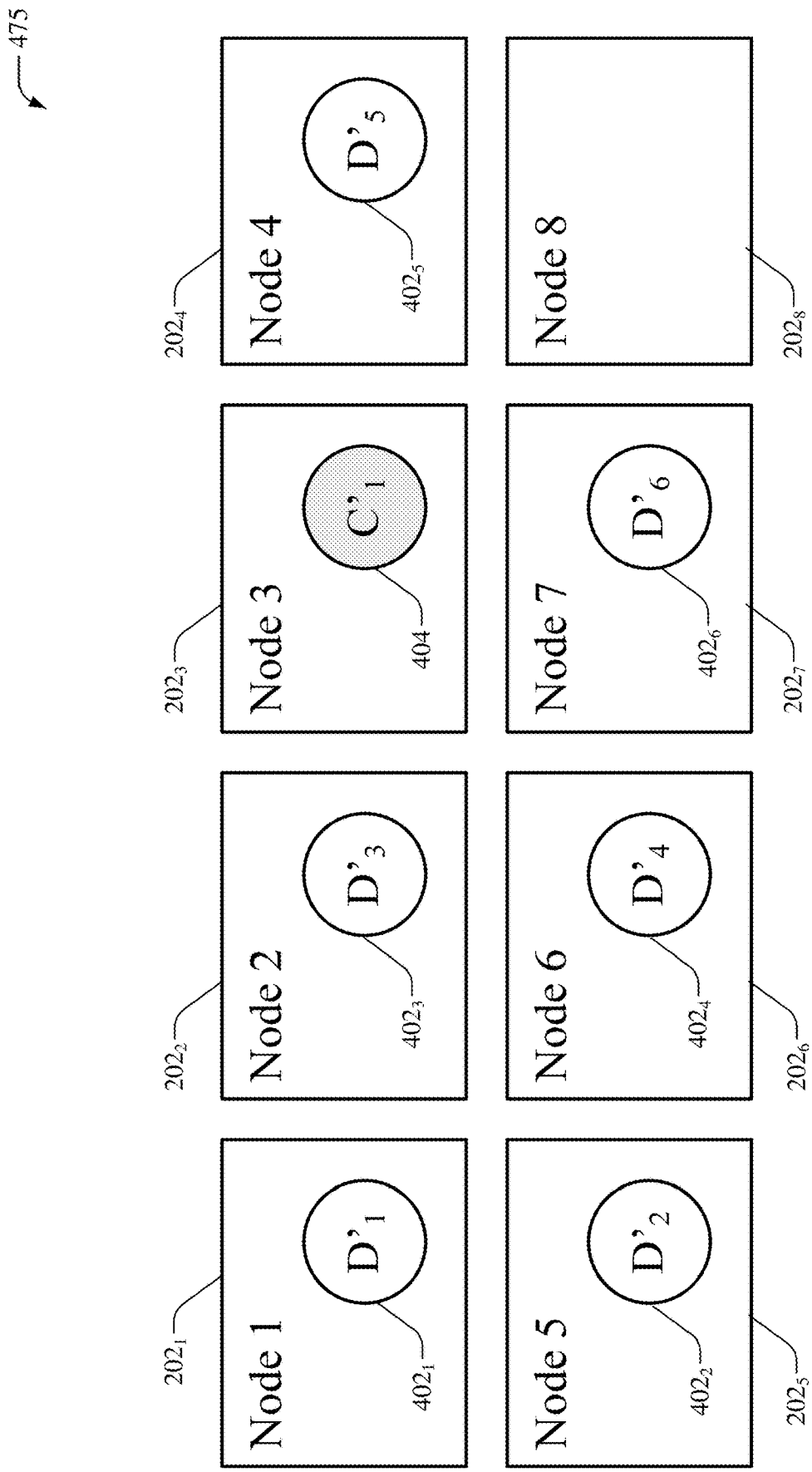

Referring now to FIGS. 4A-4C, there illustrated are example systems 400, 450, and 475 that provide an efficient implementation for data re-protection in accordance with an aspect of the specification. Systems 400, 450, and 475 depict an example scenario wherein an erasure coding protection scheme is updated when the size of a storage cluster increases (e.g., is doubled). However, it is noted that the subject specification is not limited to changing erasure coding protection scheme when size of the storage cluster is increased and that the erasure coding protection scheme can be changed, based on the embodiments described herein, when the size of the storage cluster is decreased. System 400 depicts a cluster of four nodes, Node 1-Node 4 ($202_1$-$202_4$), that utilizes a 3+1 protection scheme and system 450 depicts a scenario wherein four additional nodes, Node 5-Node 8 ($202_5$-$202_8$), have been added to the cluster and system 475 depicts the expanded cluster after re-protection has been performed.

In example system 400, data "D" can be divided into three data fragments D1, D2, and D3. A coding matrix (CM) can be defined as follows:

$$CM = |1\ 1\ 1| \quad (2)$$

Further, a coding fragment C1 can be calculated using the equation below:

$$C1 = D1 + D2 + D3 \quad (3)$$

Wherein summing up (+) can be replaced with XORing up.

According to an aspect, the data and/or coding fragments can be stored as pairs of adjacent sub-fragments. Typically, the sub-fragments can be (but are not limited to be) of equal size. For example, D1 can be stored as $D1^1$ ($204_{11}$) and $D1^2$ ($204_{12}$); D2 can be stored as $D2^1$ ($204_{21}$) and $D2^2$ ($204_{22}$); D3 can be stored as $D3^1$ ($204_{31}$) and $D3^2$ ($204_{32}$); and C1 can be stored as $C1^1$ ($206_1$) and $C1^2$ ($206_2$). As the size of the cluster is increases (e.g., is doubled), the storage system can update the erasure coding protection scheme to a 6+1 protection scheme. In an aspect, the coding matrix above can be expanded via basic doubling. The new coding matrix (CM') can be defined as:

$$CM' = |CMCM| = |1\ 1\ 1\ 1\ 1\ 1| \quad (4)$$

Further, the new coding fragment (C'1) 404 can be calculated using the equation below:

$$C'_1 = C_1^1 + C_1^2 \quad (5)$$

Wherein summing up can be replaced with XORing up. Further, three data sub-fragments (e.g., $D1^2$ ($204_{12}$), $D2^2$ ($204_{22}$), and $D3^2$ ($204_{32}$)) can be moved to the newly added nodes (e.g., $202_5$, $202_6$, and $202_7$, respectively) as shown by the arrows in FIG. 4B. Accordingly, re-protection of data D utilizes reduced amount of system resources (e.g., network/drive traffic, memory, and CPU), for example, as compared to the system resources utilized by systems 200-250. Further, the re-protection scheme disclosed herein allows a reduction of total cost of ownership (TCO). FIG. 4C depicts the cluster after re-protection has been performed, wherein D'$_1$ ($402_1$)=$D_1^1$ ($204_{11}$); D'$_2$ ($402_2$)=$D_1^2$ ($204_{12}$); D'$_3$ ($402_3$)=$D_2^1$ ($204_{21}$); D'$_4$ ($402_4$)=$D_2^2$ ($204_{22}$); D'$_5$ ($402_5$)=$D_3^1$ ($204_{31}$); and D'$_6$ ($402_6$)=$D_3^2$ ($204_{32}$).

Figure 5A:
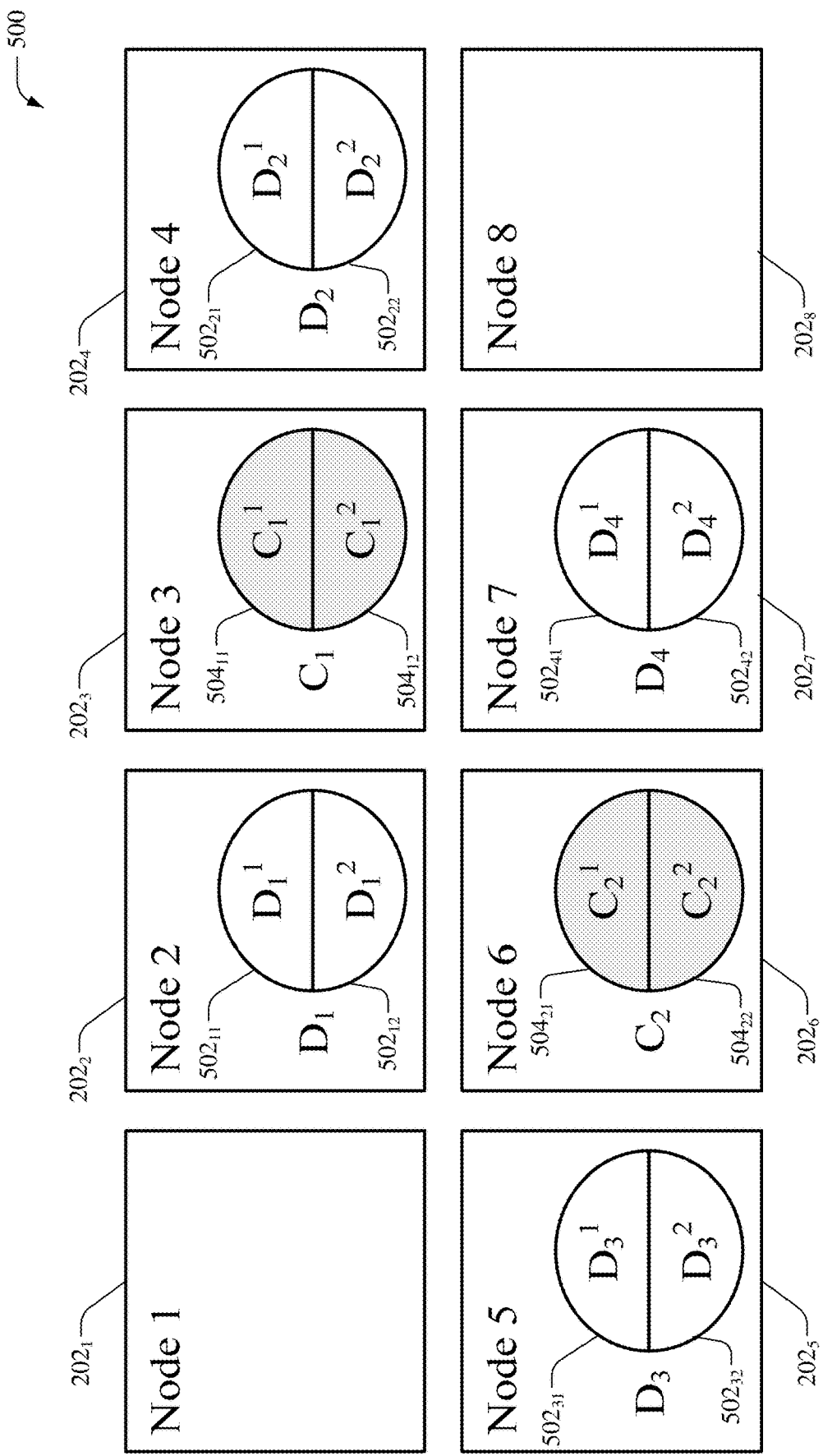
FIGS. 5A-5C illustrate example systems for re-protection of data associated with multiple coding fragments in accordance with an aspect of the specification.
Figure 5B:
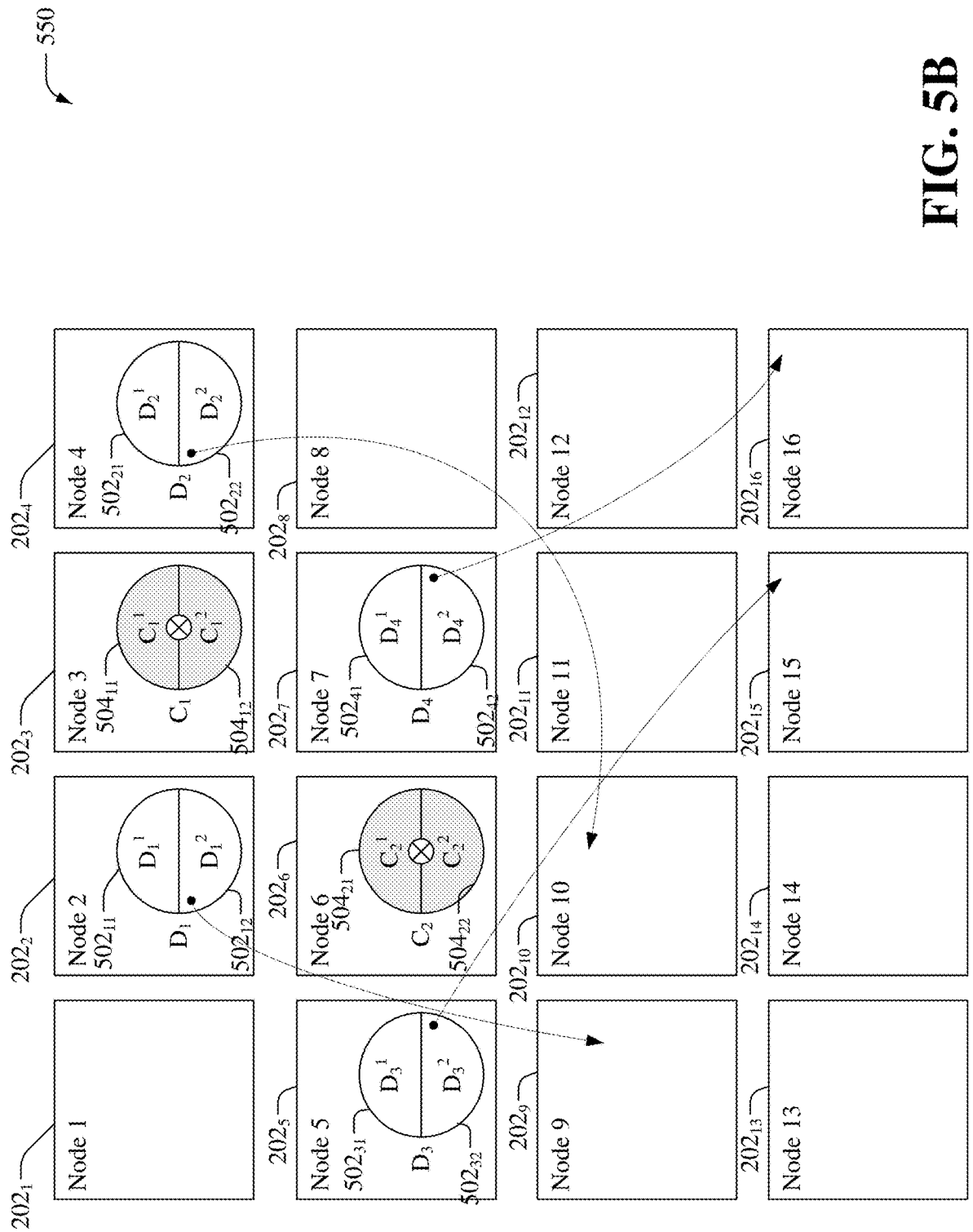
Figure 5C:
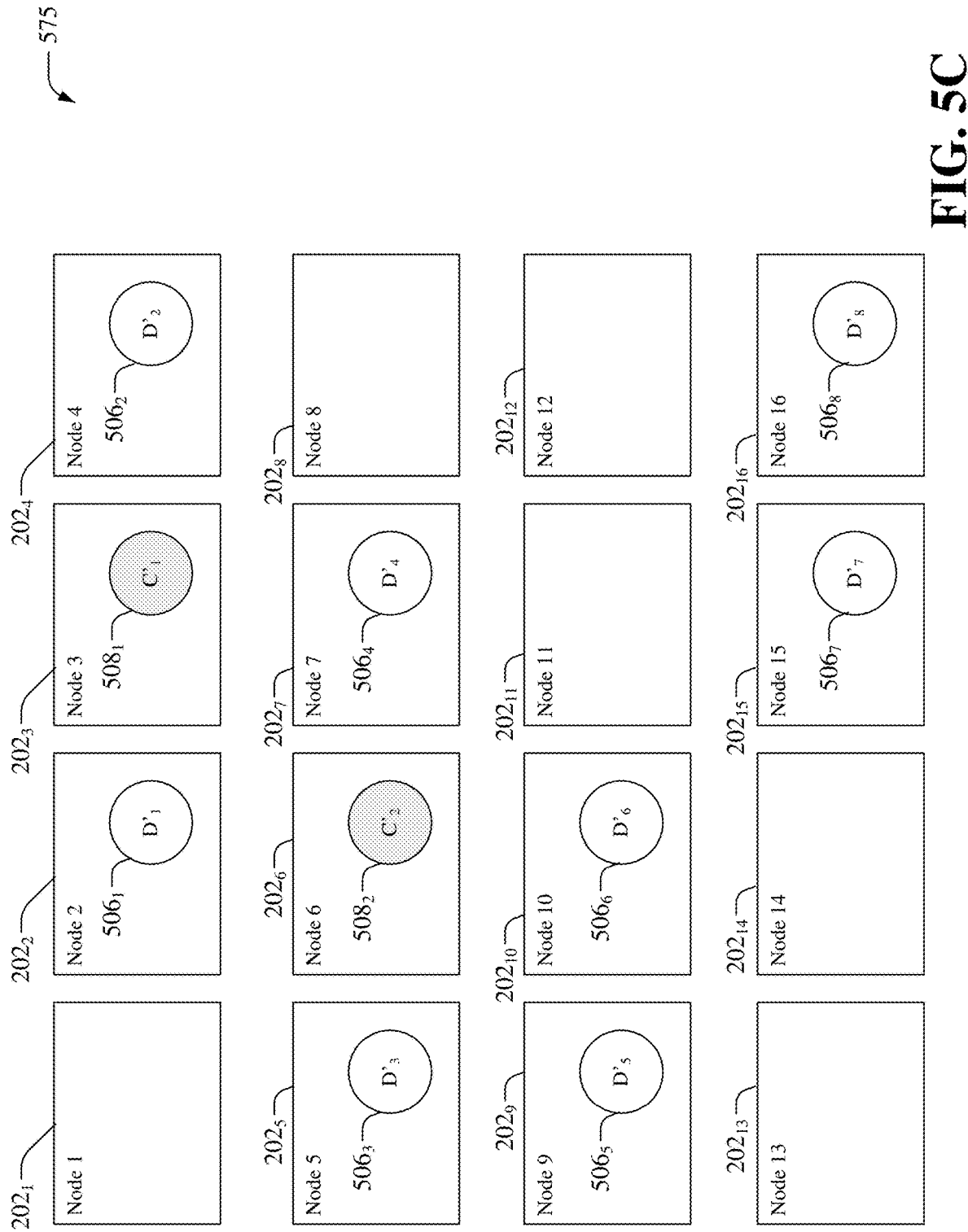

Referring now to FIGS. 5A-5C, there illustrated are example systems 500, 550, and 575 that provide an efficient implementation for re-protection of data that has multiple coding fragments in accordance with an aspect of the specification. Systems 500, 550, and 575 depict an example scenario wherein an erasure coding protection scheme is updated when the size of a storage cluster increases (e.g., is doubled). However, it is noted that the subject specification is not limited to changing erasure coding protection scheme when size of the storage cluster is increased and that the erasure coding protection scheme can be changed, based on the embodiments described herein, when the size of the storage cluster is decreased. System 500 depicts a cluster of eight nodes, Node 1-Node 8 ($202_1$-$202_8$), that utilizes a 4+2 protection scheme, system 550 depicts a scenario wherein eight additional nodes, Node 9-Node 16 ($202_9$-$202_{16}$), have been added to the cluster, and system 575 depicts the expanded cluster after re-protection has been performed.

In example system 500, data "D" can be divided into four data fragments D1, D2, D3, and D4. A coding matrix (CM) can be defined as follows:

$$CM = \begin{vmatrix} X_{1,1} & X_{1,2} & X_{1,3} & X_{1,4} \\ X_{2,1} & X_{2,2} & X_{2,3} & X_{2,4} \end{vmatrix} \quad (6)$$

Wherein Xi,j are defined coefficients. Further, coding fragments C1 and C2 can be calculated using the equations below:

$$C_1 = X_{1,1}*D_1 + X_{1,2}*D_2 + X_{1,3}*D_3 + X_{1,4}*D_4 \quad (7)$$

$$C_2 = X_{2,1}*D_1 + X_{2,2}*D_2 + X_{2,3}*D_3 + X_{2,4}*D_4 \quad (8)$$

Wherein summing up (+) can be replaced with XORing up.

According to an aspect, the data and/or coding fragments can be stored as pairs of adjacent sub-fragments. Typically, the sub-fragments can be (but are not limited to be) of equal size. For example, D1 can be stored as D1$^1$ ($502_{11}$) and D1$^2$ ($502_{12}$); D2 can be stored as D2$^1$ ($502_{21}$) and D2$^2$ ($502_{22}$); D3 can be stored as D3$^1$ ($502_{31}$) and D3$^2$ ($502_{32}$); D4 can be stored as D4$^1$ ($502_{41}$) and D4$^2$ ($502_{42}$); C1 can be stored as C1$^1$ ($504_{11}$) and C1$^2$ ($504_{12}$); and C2 can be stored as C2$^1$ ($504_{21}$) and C1$^2$ ($504_{22}$). As the size of the cluster is increased (e.g., is doubled), the storage system can update the erasure coding protection scheme to an 8+2 protection scheme. In an aspect, the coding matrix above can be expanded via basic doubling. The new coding matrix (CM') can be defined as:

$$CM' = |CM \quad CM| = \begin{vmatrix} X_{1,1} & X_{1,2} & X_{1,3} & X_{1,4} & X_{1,1} & X_{1,2} & X_{1,3} & X_{1,4} \\ X_{2,1} & X_{2,2} & X_{2,3} & X_{2,4} & X_{2,1} & X_{2,2} & X_{2,3} & X_{2,4} \end{vmatrix} \quad (9)$$

Further, the new coding fragments C'1 ($508_1$) and C'2 ($508_2$) and can be calculated using the equation below:

$$C'_1 = C_1^1 + C_1^2 \quad (10)$$

$$C'_2 = C_2^1 + C_2^2 \quad (11)$$

Wherein summing up can be replaced with XORing up. Further, four data sub-fragments (e.g., D1$^2$ ($204_{12}$), D2$^2$ ($204_{22}$), D3$^2$ ($204_{32}$), and D4$^2$ (20442)) can be moved to new nodes (e.g., $202_9$, $202_{10}$, $202_{15}$, and $202_{16}$, respectively) as shown by the arrows in FIG. 5B. Accordingly, re-protection of data D utilizes reduced amount of system resources (e.g., network/drive traffic, memory, and CPU), for example, as compared to the system resources utilized by systems 200-250. Further, the re-protection scheme disclosed herein allows a reduction of total cost of ownership (TCO). FIG. 5C depicts the cluster after re-protection has been performed, wherein D'$_1$ ($506_1$) is D$_1^1$ ($502_{11}$); D'$_2$ ($506_2$) is D$_2^1$ ($502_{21}$); D'$_3$ ($506_3$) is D$_3^1$ ($502_{31}$); D'$_4$ ($506_4$) is D$_4^1$ ($502_{11}$); D'$_5$ ($506_5$) is D$_1^2$ ($502_{12}$); D'$_6$ ($506_6$) is D$_2^2$ ($502_{22}$); D'$_7$ ($506_7$) is D$_3^2$ ($502_{32}$); and D'$_8$ ($506_8$) is D$_4^2$ ($502_{42}$).

Figure 6:
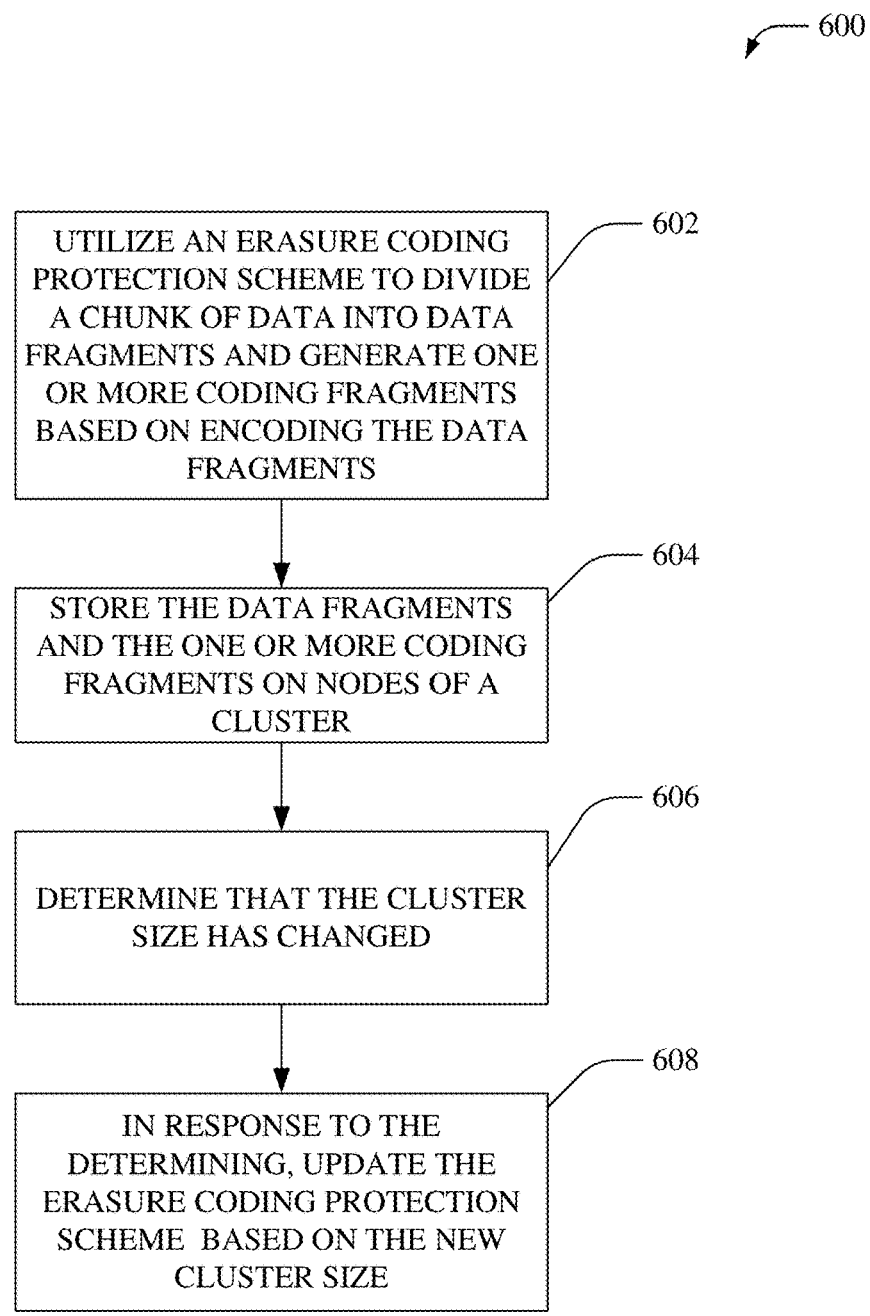
FIG. 6 illustrates an example method that facilitates updating a protection scheme utilized in an object storage system.
Figure 7:
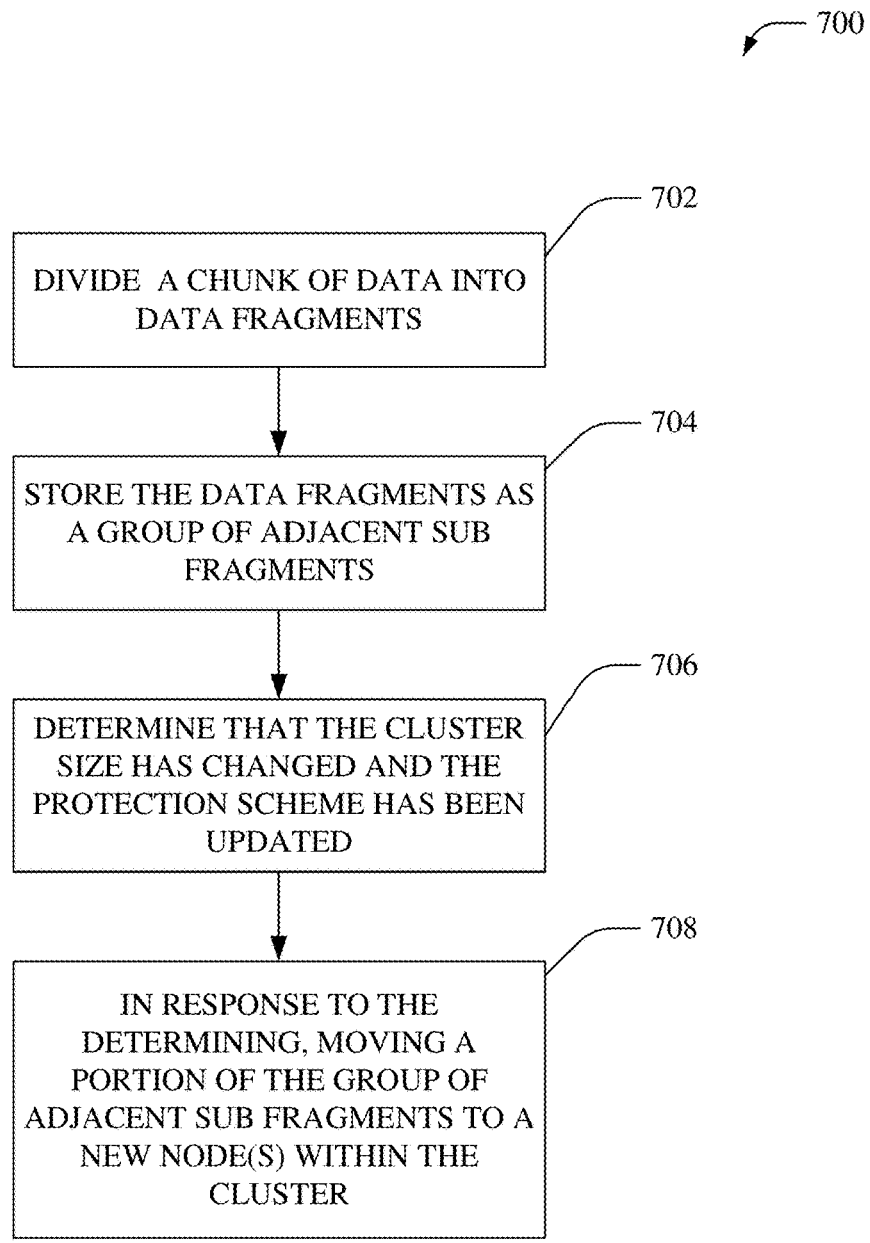
FIG. 7 illustrates an example method for storing data to facilitate scale-out erasure coding.
Figure 8:
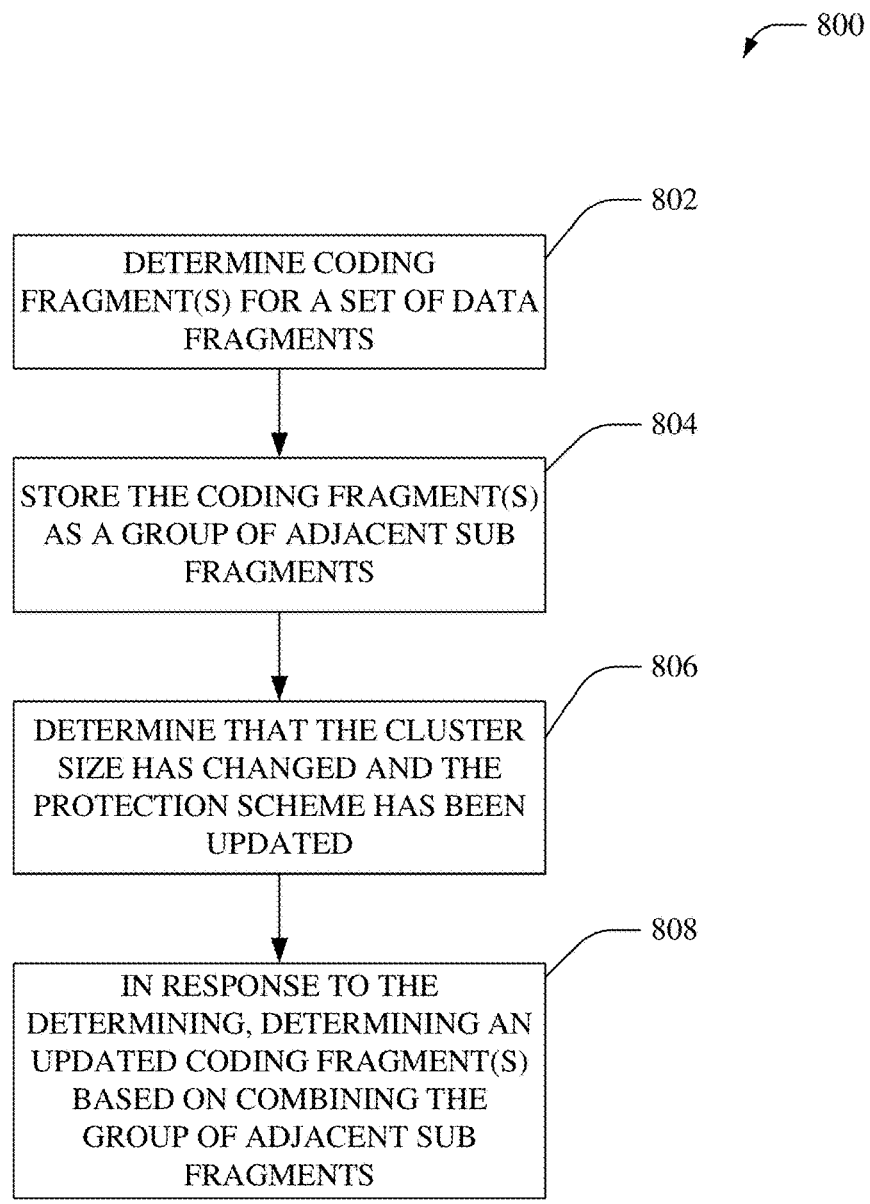
FIG. 8 illustrates an example method for storing coding fragments to facilitate scale-out erasure coding.

FIGS. 6-8 illustrate flow diagrams and/or methods in accordance with the disclosed subject matter. For simplicity of explanation, the flow diagrams and/or methods are depicted and described as a series of acts. It is to be understood and appreciated that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 6, there illustrated is an example method 600 that facilitates updating a protection scheme utilized in an object storage system, according to an aspect of the subject disclosure. In one aspect, method 600 can be implemented by one or more nodes of the object storage system. At 602, a defined erasure coding protection scheme (k+m) can be utilized to divide a chunk of data can be into data fragments and generate one or more coding fragments based on encoding the data fragments. At 604, the data fragments and the one or more coding fragments can be stored on nodes of a cluster (e.g., ECS cluster). At 606, it can be determined that the cluster size has changed (e.g., additional nodes have been added to the cluster). At 608, in response to determining that the cluster size has change, updating the protection scheme, for example, to better suit the new cluster size. As an example, the value of k and/or m can be changed to provide a higher capacity use efficiency while satisfying tolerance criteria associated with the number of node failures the storage system can endure.

FIG. 7 illustrates an example method 700 for storing data to facilitate scale-out erasure coding, according to an aspect of the subject disclosure. According to an aspect, method 700 can be implemented by one or more nodes of the object storage system. At 702, a chunk of data can be divided into data fragments. At 704, the data fragments can be stored as a group of adjacent sub-fragments. At 706, it can be determined that the cluster size has changed (e.g., additional nodes have been added to the cluster) and that the protection scheme has been updated (e.g., optimized for the new cluster size). At 708, in response to the determination, a portion of the group of adjacent sub-fragments can be moved to new nodes(s) within the cluster.

FIG. 8 illustrates an example method 800 for storing coding fragments to facilitate scale-out erasure coding, according to an aspect of the subject disclosure. According to an aspect, method 800 can be implemented by one or more nodes of the object storage system. At 802, a coding fragment(s) can be determined for a set of data fragments (e.g., associated with a chunk of data). As an example, the coding fragment can be determined by employing a defined coding matrix associated with an erasure coding protection scheme. At 804, the coding fragment(s) can be stored as a group of adjacent sub-fragments. At 806, it can be determined that the cluster size has changed (e.g., additional nodes have been added to the cluster) and that the protection scheme has been updated (e.g., optimized for the new cluster size). At 808, in response to the determination, an updated coding fragment(s) can be determined based on combining (e.g., XORing) the group of adjacent sub-fragments.

Figure 9:
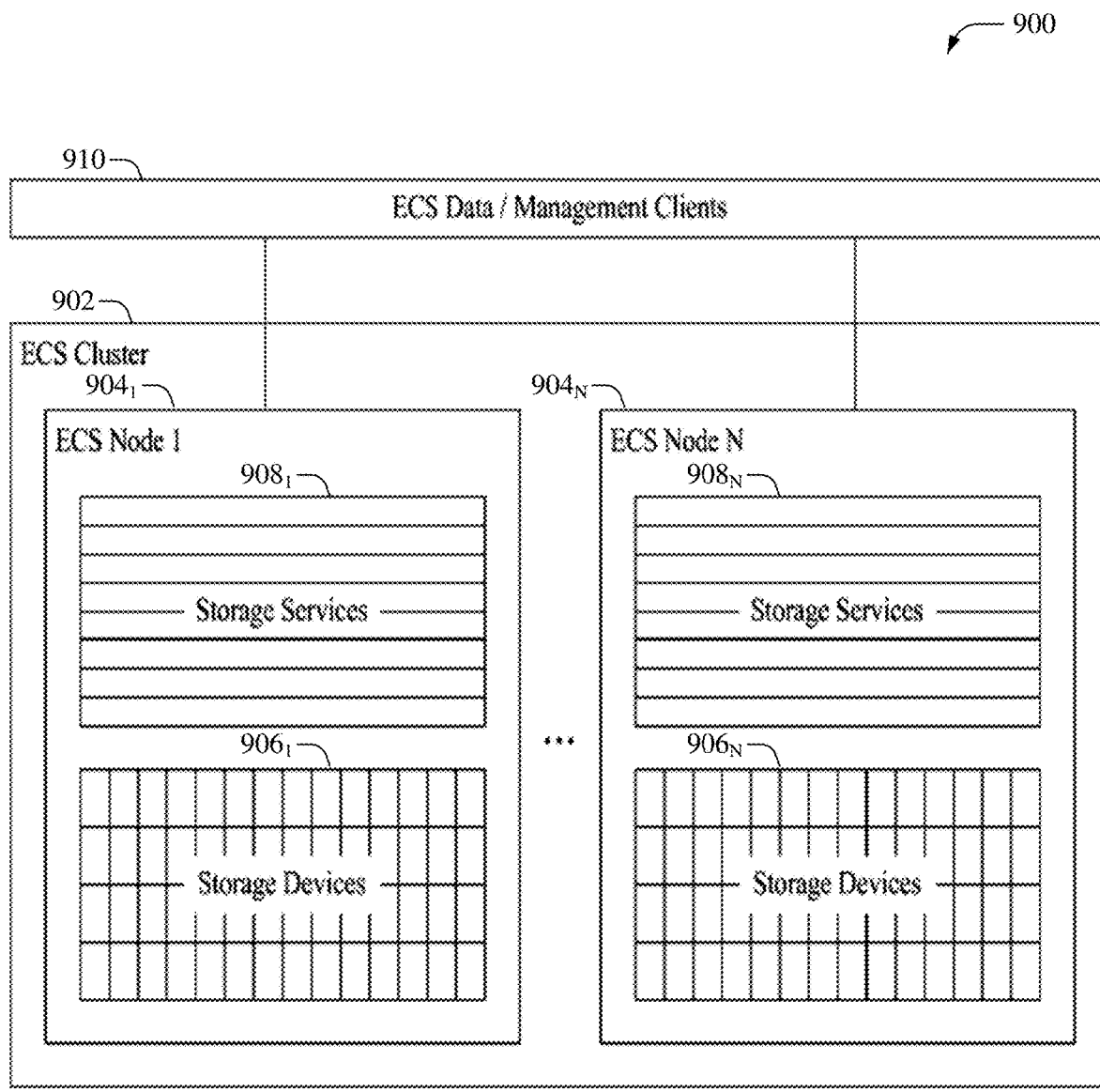
FIG. 9 illustrates high-level architecture of an Elastic Cloud Storage (ECS) cluster that employs scale-out erasure coding.

FIG. 9 illustrates an example high-level architecture 900 of an ECS cluster, according to an aspect of the subject disclosure. ECS can comprise a software-defined, cloud-scale, object storage platform that combines the cost advantages of commodity infrastructure with the reliability, availability and serviceability of traditional arrays. With ECS, an organization can deliver scalable and simple public cloud services with the reliability and control of a private-cloud infrastructure. ECS provides comprehensive protocol support for unstructured (object and/or file) workloads on a single, cloud-scale storage platform. In an aspect, the ECS cluster 902 can comprise multiple nodes $904_1$-$904_N$, wherein N is most any integer. It is noted that the nodes $904_1$-$904_N$ are substantially similar to the nodes 102 and/or Nodes 1-16 ($202_1$-$202_{16}$) described herein and can include functionality as more fully described herein, for example, as described above with regard to the nodes 102 and/or Nodes 1-16 ($202_1$-$202_{16}$). The nodes $904_1$-$904_N$ can comprise storage devices (e.g. hard drives) $906_1$-$906_N$ and can run a set of services $908_1$-$908_N$. For example, single node that runs ECS version 3.0 can manage 20 independent services. Further, ECS data/management clients 910 can be coupled to the nodes $904_1$-$904_N$.

The ECS cluster 902 does not protect user data with traditional schemes like mirroring or parity protection. Instead, the ECS cluster 902 utilizes a k+m erasure coding protection scheme, wherein a data block is divided into k data fragments and m coding fragments are created (e.g., by encoding the k data fragments). Encoding is performed in a manner such that the cluster 902 can tolerate the loss of any m fragments.

Figure 10:
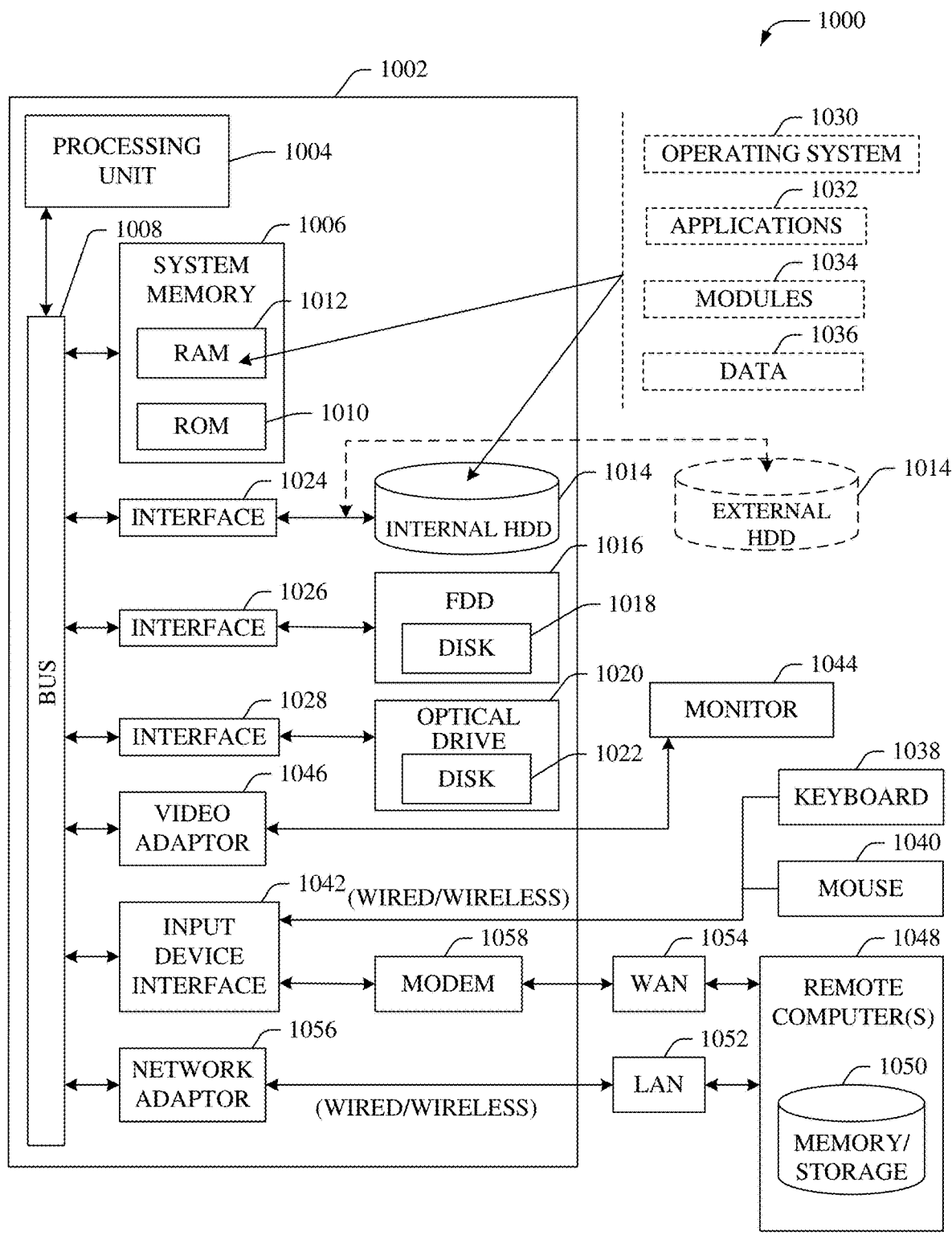
FIG. 10 illustrates a block diagram of an example computer operable to execute the disclosed storage system architecture.

Referring now to FIG. 10, there is illustrated a block diagram of a computer 1002 operable to execute the disclosed storage architecture. In order to provide additional context for various aspects of the disclosed subject matter, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference again to FIG. 10, the example environment 1000 for implementing various aspects of the specification includes a computer 1002, the computer 1002 including a processing unit 1004, a system memory 1006 and a system bus 1008. As an example, the component(s), server(s), node(s), cluster(s), system(s), driver(s), module(s), agent(s), engine(s), and/or device(s) disclosed herein with respect to systems 100-700 can each include at least a portion of the computer 1002. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014, which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is noted that the specification can be implemented with various commercially available operating systems or combinations of operating systems.

A user can enter commands and information into the computer 1002 through one or more wired/wireless input devices, e.g., a keyboard 1038 and/or a pointing device, such as a mouse 1040 or a touchscreen or touchpad (not illustrated). These and other input devices are often connected to the processing unit 1004 through an input device interface 1042 that is coupled to the system bus 1008, but can be connected by other interfaces, such as a parallel port, an IEEE 1394 serial port, a game port, a USB port, an infrared (IR) interface, etc. A monitor 1044 or other type of display device is also connected to the system bus 1008 via an interface, such as a video adapter 1046.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It is noted that the network connections shown are example and other means of establishing a communications link between the computers can be used.

The computer 1002 is operable to communicate with any wireless devices or entities operatively disposed in wireless communication, e.g., desktop and/or portable computer, server, communications satellite, etc. This includes at least WiFi and Bluetooth® wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, n, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 5 GHz radio band at an 54 Mbps (802.11a) data rate, and/or a 2.4 GHz radio band at an 11 Mbps (802.11b), an 54 Mbps (802.11g) data rate, or up to an 600 Mbps (802.11n) data rate for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations In the subject specification, terms such as "data store," data storage," "database," "cache," and substantially any other information storage component relevant to operation and functionality of a component, refer to "memory components," or entities embodied in a "memory" or components comprising the memory. It is noted that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Furthermore, the terms "user," "consumer," "client," and the like are employed interchangeably throughout the subject specification, unless context warrants particular distinction(s) among the terms. It is noted that such terms can refer to human entities or automated components/devices supported through artificial intelligence (e.g., a capacity to make inference based on complex mathematical formalisms), which can provide simulated vision, sound recognition and so forth.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
      storing, across first nodes of a network-based storage system, data fragments associated with a chunk of data, wherein the storing comprises storing the data fragments as respective groups of adjacent data sub-fragments;

storing, within a second node of the network-based storage system, a first coding fragment associated with the data fragments, wherein the storing comprises storing the first coding fragment as a group of adjacent coding sub-fragments; and in response to determining that a set of additional nodes, of the network-based storage system other than the first nodes or the second node, have been added to the network-based storage system, moving a portion of the respective groups of adjacent data sub-fragments to the set of additional nodes, and combining the group of adjacent coding sub-fragments to generate a second coding fragment different than the first coding fragment.

2. The system of claim 1, wherein the combining comprises adding the group of adjacent coding sub-fragments together to generate the second coding fragment.

3. The system of claim 1, wherein the combining comprises performing an exclusive disjunction operation with respect to at least two adjacent coding sub-fragments of the group of adjacent coding sub-fragments.

4. The system of claim 1, wherein the operations further comprise:
storing, within the second node, the second coding fragment; and
deleting the first coding fragment.

5. The system of claim 1, wherein the first coding fragment is determined based on defined coding matrix data.

6. The system of claim 1, wherein the data fragments and the first coding fragment are determined based on an erasure coding process and the operations further comprise:
in response to the determining, updating the erasure coding process resulting in an updated erasure coding process.

7. The system of claim 6, wherein the updating comprises updating the erasure coding process based on an analysis that compares a capacity benefit of the updated erasure coding process relative to a cost associated with data re-protection via the updated erasure coding process.

8. The system of claim 6, wherein the updating comprises updating the erasure coding process to increase a defined measure of capacity use efficiency for the network-based storage system.

9. The system of claim 6, wherein the updating comprises updating the erasure coding process to satisfy a defined tolerance criterion associated with a number of node failures determined to have been endured by the network-based storage system.

10. The system of claim 1, wherein the network-based storage system comprises an object storage system.

11. A method, comprising:
based on an erasure coding scheme, determining, by a system comprising a processor, data fragments and a coding fragment associated with a chunk of data;
storing, within different nodes of an object storage system, the data fragments as respective groups of adjacent data sub-fragments and the coding fragment as a group of adjacent coding sub-fragments; and in response to determining that additional nodes have been added to the object storage system:
moving a portion of the respective groups of adjacent data sub-fragments to the additional nodes, and
combining the group of adjacent coding sub-fragments to generate an updated coding fragment.

12. The method of claim 11, wherein the combining adding the group of adjacent coding sub-fragments.

13. The method of claim 11, wherein the combining comprises performing an exclusive disjunction operation to generate the updated coding fragment.

14. The method of claim 11, wherein the storing comprises storing the data fragments and the coding fragment within an elastic cloud system.

15. The method of claim 11, wherein the erasure coding scheme is a first erasure coding scheme and the method further comprises:
in response to the determining that the set of additional nodes have been added to the object storage system, selecting a second erasure coding scheme to protect the chunk of data.

16. The method of claim 11, wherein the determining the coding fragment comprises determining the coding fragment based on a defined coding matrix associated with the erasure coding scheme.

17. A non-transitory computer-readable medium comprising instructions that, in response to execution, cause a system comprising a processor to perform operations, comprising:
based on an erasure coding, determining, data fragments and a coding fragment associated with a chunk of data;
storing, within different nodes of an object storage system, the data fragments as respective groups of adjacent data sub-fragments and the coding fragment as a group of adjacent coding sub-fragments; and
in response to determining that additional nodes have been added to the object storage system,
facilitating a transfer of a portion of the respective groups of adjacent data sub-fragments to the additional nodes, and
updating the coding fragment based on a result of combining the group of adjacent coding sub-fragments.

18. The non-transitory computer-readable medium of claim 17, wherein the updating comprises adding the group of adjacent coding sub-fragments.

19. The non-transitory computer-readable medium of claim 17, wherein the updating comprises generating an updated coding fragment based on performing an exclusive OR operation on the group of adjacent coding sub-fragments.

20. The non-transitory computer-readable medium of claim 17, wherein the object storage system comprises an elastic cloud system.

* * * * *